United States Patent
Zamir

(10) Patent No.: US 9,424,021 B2
(45) Date of Patent: Aug. 23, 2016

(54) CAPTURING UPDATES TO APPLICATIONS AND OPERATING SYSTEMS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/564,843

(22) Filed: Dec. 9, 2014

(65) Prior Publication Data

US 2016/0162279 A1    Jun. 9, 2016

(51) Int. Cl.
*G06F 9/445* (2006.01)
*H04L 29/08* (2006.01)

(52) U.S. Cl.
CPC . *G06F 8/65* (2013.01); *G06F 8/61* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2006/0168574 A1* | 7/2006 | Giannini | G06F 8/65 | 717/168 |
| 2010/0031251 A1* | 2/2010 | Hsieh | G06F 9/44505 | 717/175 |
| 2011/0113416 A1* | 5/2011 | McCurdy | G06F 8/65 | 717/168 |
| 2013/0047160 A1* | 2/2013 | Conover | G06F 8/65 | 718/1 |
| 2013/0132942 A1* | 5/2013 | Wang | G06F 9/45504 | 717/176 |
| 2014/0101652 A1* | 4/2014 | Kamble | G06F 9/45558 | 717/171 |
| 2014/0173577 A1* | 6/2014 | Mitchell | G06F 8/67 | 717/168 |
| 2014/0331214 A1* | 11/2014 | Mahajan | G06F 8/43 | 717/140 |
| 2015/0205594 A1* | 7/2015 | Pruessmann | G06F 8/65 | 717/170 |

\* cited by examiner

*Primary Examiner* — Daxin Wu

(57) ABSTRACT

An enterprise network management system is described for automatically updating program layers. A program is installed on a reference machine designated for the program and the reference machine is subsequently suspended. When the system detects a newer version of the program on a client device on the network, the reference machine is resumed, the program is allowed to update to the newer version, an updated program layer for the newer version is captured and stored, and the reference machine is suspended. Thereby, when a program layer for the updated application is required for IT operations, the layer will be available. The process can repeat when subsequent versions of the program are detected on client devices.

17 Claims, 5 Drawing Sheets

CAPTURING UPDATES TO APPLICATIONS AND OPERATING SYSTEMS

TECHNICAL FIELD

The present disclosure generally relates to techniques for updating and managing software applications and operating systems on computing devices in enterprise environments.

BACKGROUND

Enterprise desktop management is one of the most challenging tasks for Information Technology (IT) departments of large organizations today. A typical IT department needs to manage large numbers of user devices, which can be spread over wide geographies and contain a diversity of software applications and operating systems. In turn, the IT department needs to be able to carry out various tasks on the client devices, such as performing back-ups, delivering upgrades, restoring devices, migrating users between computing devices, and fixing bugs or problems; quickly, efficiently, and with minimal interruption to users of the client devices on the network. Increasing complexity of software programs, frequent software updates, and limited resources compounds these difficulties.

Software updates create particular challenges for IT departments. For example, software applications and operating systems on client devices may be frequently updated, such as weekly or even daily. The updates may be initiated automatically via the internet or by the user of the client device without knowledge of the IT department. As a result, when the IT department performs operations on a client device, it may not have packages available for all of the most recent versions of applications and operating systems that may be present on the client device. Consequently, several problems may occur as a result of an older version of an application or operating system being applied on a client device, such as installation issues, security issues, and broken applications due to backward compatibility problems. A more efficient approach is desirable for managing application and operating system updates in enterprise network environments.

DETAILED DESCRIPTION

Figure 1:
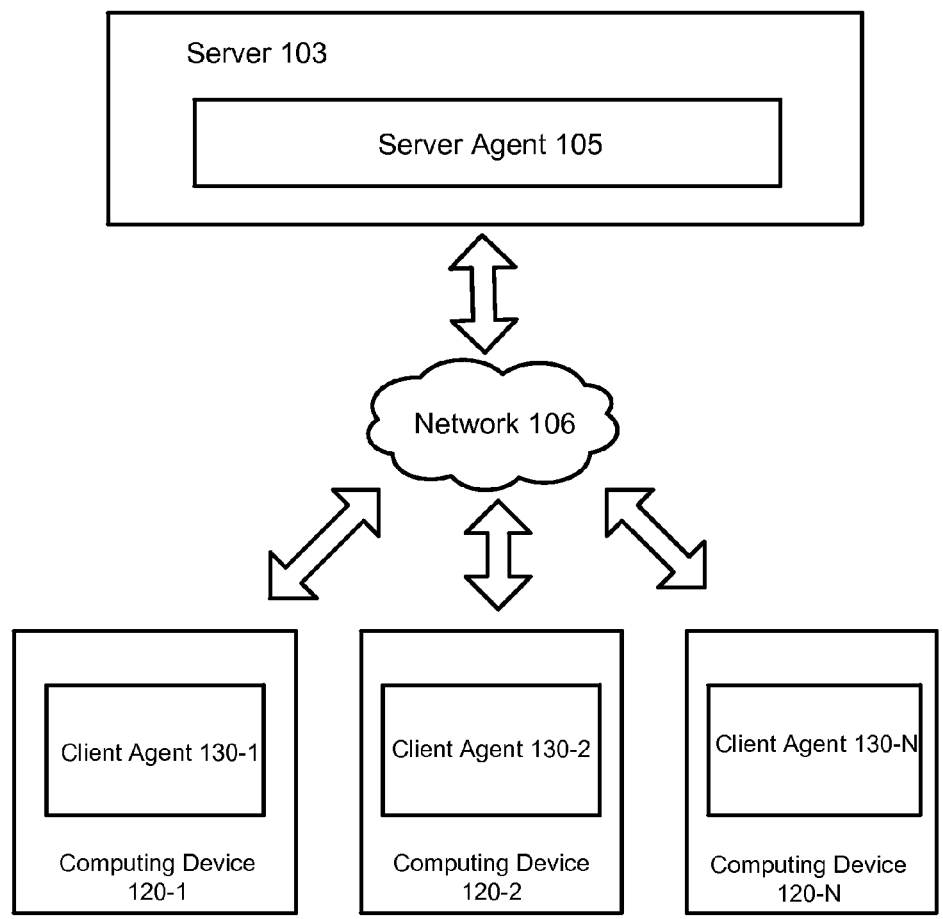
FIG. 1 illustrates an example of an enterprise network environment, in accordance with various embodiments.

Systems and methods in accordance with various embodiments of the present disclosure overcome at least some of the above mentioned shortcomings and deficiencies by providing more efficient ways to manage client devices in enterprise environments. In particular, embodiments described herein improve the efficiency of managing updates of applications and operating systems on client devices.

The system comprises multiple endpoint computing devices, such as employee laptops, capable of communicating with a central management server, where each endpoint device includes a client installed thereon to facilitate remote management of the endpoint device by the server. IT administration functions can be carried out on the multiple computing devices through the server communicating with the clients operating on the various devices. The systems and methods described herein provide for automatic and continuous capture of operating system updates and application updates to provide the most current versions of applications and operating systems to the IT department.

In various embodiments, a "program layer" can be developed by the IT department ("IT") for deploying a program onto client devices. To install the corresponding program on a client device of an end user, the layer content can be sent from the server to the endpoint device and merged with the content of the software on the device, thereby avoiding the need for a typical application installation process. An operating system layer, or a "base layer", can be an IT-captured preferred operating system image of a specific version of an operating system. A layer for an application, or an "application layer", can be an IT-captured layer of a specific version of an application. IT can capture an application layer on a clean reference machine (for example, a virtual machine), by recording a pre-installation and post-installation snapshot of the virtual machine and creating the application layer based on the differences between the snapshots. For example, the differences in the file system and registry entries between the pre-installation snapshot and post-installation snapshot can be recorded into a delta package that is referred to herein as the application layer. This application layer can be sent to each client device, where the agent operating on the client device can merge the content of the application layer onto the client device. IT can combine a base layer with any number of application layers and send them from the central server to end user devices. With these layers, IT can deliver new programs to user devices, update programs by capturing new versions of these layers and re-sending them, remove programs if needed, or fix programs automatically by re-enforcing these layers on end user devices.

To carry out its functions effectively and efficiently, IT needs to have layers for the most recent versions of applications and operating systems that may be present on a client device. Otherwise, if a layer for an older version of a program than the version present on a client device is used to perform an IT operation on the client device, the operation may result in installation issues, security issues, and broken applications due to backward compatibility issues. However, with frequent updates to operating systems and applications becoming typical, at times weekly or even daily, manually capturing layers for each new update as soon as it becomes available is a formidable task for IT. The systems and methods described herein suggest mechanisms for automatic layer capture for updated applications and updated operating systems that avoid the need for manual re-capture of layers for program updates. Accordingly, after a program layer of an initial version of an application or operating system is captured, the layer can be automatically re-captured for subsequent updates of the application or operating system.

IT can produce an initial layer of a program, whether an application or an operating system, on a clean reference machine designated for the program, which can be a computing device or a virtual machine (VM) on the network. An initial version of the program can be installed on the reference machine and a layer for the program can be captured. After the layer is captured, the reference machine can be suspended.

A client program installed on client devices on the network periodically uploads changes from each client device, for example, such changes can be uploaded every hour as part of a back-up process on the client device. The system can monitor the uploaded content and when the system detects that uploaded changes from a client device include a new version of a program, it triggers the automatic re-capture of the corresponding layer for the program. For example, the system can detect new versions by monitoring the Windows MSI database, Windows Update catalog, and Windows event log.

The re-capture process resumes the reference machine designated for the program and updates the program, whether by allowing an automatic update or otherwise triggering the update. In various embodiments, the system can detect that the update was completed successfully by monitoring the Windows MSI application database or the Windows Update catalog, and by monitoring the Windows event log for installation completion events. Once the update is completed, the system captures a new layer for the updated program and suspends the reference machine again. Subsequently, each time the system detects an update to the program on any client device, the same reference machine can be resumed, the program can be updated, a new layer can be captured, and the system can be suspended once again. In other embodiments, the reference machine may not be suspended and can remain running so that the program's self-update mechanism may automatically update the program when an update becomes available. However, this approach may be wasteful of resources because it may require keeping a separate reference machine running for every program while there may be numerous programs, requiring numerous reference machines to be running full time. Furthermore, not all programs may have an automatic update mechanism; hence, in some cases, programs may need to be updated manually.

Accordingly, the system's program layer catalog containing layers for various programs is automatically populated in the background with a layer for the updated version of the program. Hence, automatic layer capture for updated programs is triggered by software updates performed on client devices. Additionally, once an updated layer for a program is produced, IT can choose to automatically push these updated layers to client devices that didn't receive the update yet, enhancing compliance and software alignment across the enterprise. Further, having such an automatically populated program layer catalog can provide the ability to fix broken program installations of the latest version of a program. For example, if an installation of a program on a client device breaks, IT can repair the installation by enforcing the corresponding program layer on the client device.

Additionally, the systems and methods described herein can provide IT with improved control over the distribution of software updates. For example, in some instances, IT may prefer to avoid distributing updates for certain programs while for other programs, IT may prefer to distribute updates quickly or as soon as the updates are available. In such situations, if IT relies on the automatic update functions of programs, updates may be distributed earlier than IT would prefer. On the other hand, if IT does not implement the automatic update functions of programs, IT may have the burden of recapturing program updates manually. The system described herein provides IT with an automatically populated program layer catalog, which can allow IT to deliver a program update to client devices when desired by deploying the corresponding program layer on the client devices, without the burden of manually capturing the program updates.

As used herein, the term "enterprise network" refers to a system of multiple client devices that are centrally managed. A client device can be either a physical machine or, in a virtual network environment, a virtual machine. For example, a client device can be a physical machine, such as a computer, a laptop, or a tablet where all of a user's data and applications are stored and accessed on the client device by the user. The client device can communicate with a central server that might be hosted in a data center (or other location) over a remote network connection, such as a WAN connection, to enable IT administrators to carry out management functions such as updates, installations, backups, and other modifications and services. An agent application on each client device can enable the communication with the central server such that instructions, requests, and/or data can be communicated between the central server and the client devices. "Client device" and "computing device" may be used interchangeably in this application. As used herein, the term "program" refers to any software program, including applications and operating systems.

The system described herein is comprised of many client devices and a central server that might be located in a data center. Each client device can be centrally managed by the server to perform operations on the client device such as updates, installations of applications, un-installations of applications, fixes, changes in settings, migration to different operating systems, etc. The server may be physically located in a data center or any other location of the enterprise.

As used herein, the term "base layer" refers to an image that contains the entire content of the operating system (e.g., Windows XP, Windows 7, etc.) that corresponds to the base layer, including files, registry entries, and certain database contents (e.g., operating system-specific databases, etc.). For example, a base layer for an operating system can be created by installing the operating system onto a computer device and scanning the entire file system of the computing device. Merging the base layer onto a computing device applies the image to the computing device by transferring the files, registry entries, and certain database contents in the base layer to the computing device, and thereby installs the operating system on the computing device. An application layer, on the other hand, contains all of the files, registry entries and databases that can be merged on a computing device to install a new application (or an updated version of an existing application) on the computing device. The application layer may also include drivers and virtual devices.

In various embodiments, when merging a layer (base layer or application layer) onto a computing device, the system can view the files, registry entries, and database entries of the computing device and compare them to the files, registry entries, and database entries in the layer. Based on the comparison, the system can determine which files should be added to the computing device, which files should be deleted from the computing device, and/or which files on the computing device should be overwritten by files in the layer. Similarly, based on the comparison, the system can determine which registry entries and database contents should be changed in the merge. A draft of how the computing device desktop will look after the merge can be produced based on the comparison and the actual changes can be implemented to complete the merge when the user restarts the computing device. The files, database entries, and/or registry entries can be stored in a side folder and the changes can be implemented when the user restarts the computing device. In various embodiments, a merge may include moving some existing files aside and placing new files from the layer instead of them. This methodology allows for modifications to be applied to the computing device seamlessly and with little interruption and downtime, as opposed to traditional methods such as executable installers, which can require the user to stop tasks, slow down the machine, and require manual assistance from the user or from IT administrators.

FIG. 1 illustrates an example of an enterprise network environment, in accordance with various embodiments. The enterprise network environment includes multiple computing devices (120-1, 120-2, 120-N) that can be centrally managed through a server 103 that is communicatively coupled with computing devices (120-1, 120-2, 120-N) via a network 106. The server 103 may be located in a data center or any other location of the enterprise. A client agent application (130-1, 130-2, 130-N) on each computing device (120-1, 120-2, 120-N) and a server agent application 105 on the server 103 can enable communication between the server 103 and the computing devices (120-1, 120-2, 120-N) such that information such as instructions, requests, and/or data can be communicated between the server 103 and the computing devices (120-1, 120-2, 120-N). Network 106 may further include numerous other components, such as one or more firewalls, connection brokers, management servers, etc., which are not shown here so as to not obscure salient features of the enterprise desktop environment. A computing device (e.g., 120-1, 120-2, 120-N) can be either a physical machine or, in a virtual network environment, a virtual machine. For example, a computing device (e.g., 120-1, 120-2, 120-N) can be a physical machine, such as a computer, a laptop, or a tablet where all of a user's data and applications are stored and accessed directly on the computing device by the user. In various embodiments, a computing device (e.g., 120-1, 120-2, 120-N) can be configured to operate as a reference machine for generating program layer updates, as described further herein. A computing device (e.g., 120-1, 120-2, 120-N) can communicate with the server 103 over a remote network connection 106, such as a WAN connection, to carry out management functions such as updates, installations, backups, migrations to new operating systems, and other modification and services. It is noted that, as used herein, a "computing device" (e.g., 120-1, 120-2, 120-N) can be a physical machine or a virtual machine. Each computing device (e.g., 120-1, 120-2, 120-N) can be centrally managed by the server 103 to perform operations on the computing device (e.g., 120-1, 120-2, 120-N) such as updates, installations of applications, uninstallations of applications, fixes, changes in settings, and migration to different operating systems for users of computing devices (e.g., 120-1, 120-2, 120-N).

It should be noted that the particular network deployment illustrated in FIG. 1 is shown purely for purposes of illustration and is not intended to be in any way inclusive or limiting to the embodiments that are described herein. For example, a typical network would include many other types of devices, such as switches, power supplies, databases, cooling systems and other environmental controls, and the like, which are not illustrated herein. Similarly, the server may not be located in a data center and might instead be located in the workplace/offices of the enterprise. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
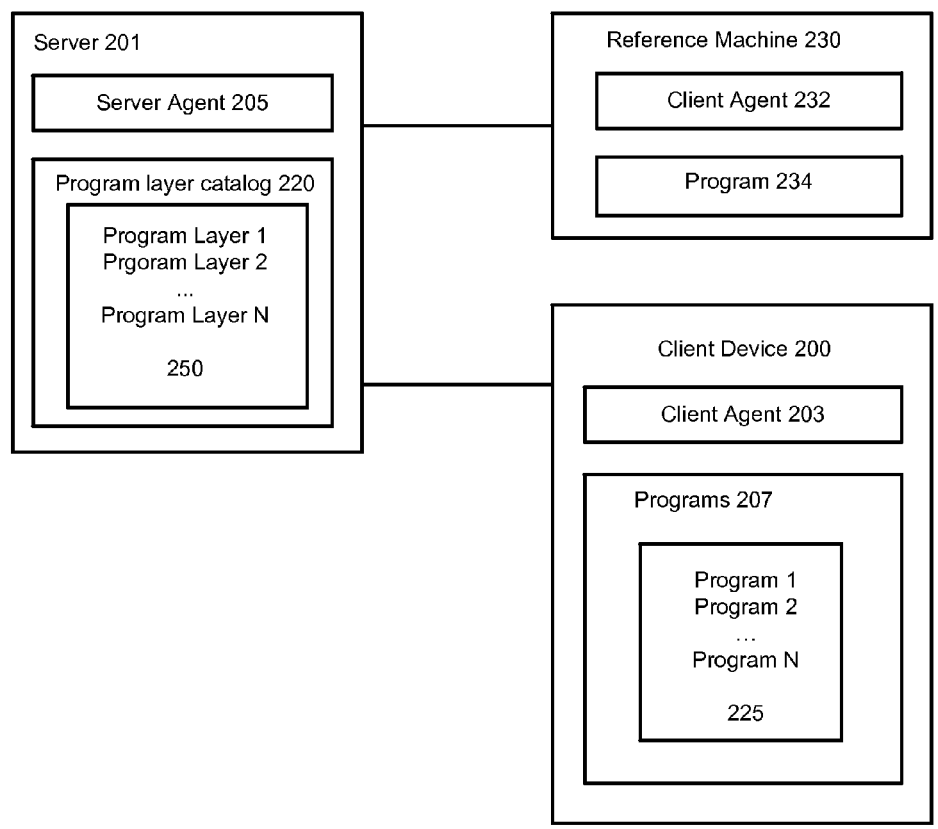
FIG. 2 provides an example of a system for automatically generating program layer updates, according to various embodiments.

FIG. 2 provides an example of a system for automatically generating program layer updates, according to various embodiments. As illustrated in the example of FIG. 2, two computing devices, a client device 200 and a computing device configured as a reference machine 230, are communicatively linked to a server 201. The client device 200 contains various programs 207, such as program 1 through program N 225. Such a client device 200 may be accessible to a user of the system. It should be noted that a typical system would include a large number of client devices to give each user of the enterprise network access to an individual computing device. A single client device 200 is illustrated in the example of FIG. 2 for the sake of simplicity. The client device 200, reference machine 230, and the server 201 can be part of an enterprise network, such as the network environment illustrated in FIG. 1.

A client agent application 203 on the client device 200 and a server agent application 205 on the server 201 can enable communication between the server 201 and the client device 200 such that information such as instructions, requests, and/or data can be communicated between the server 201 and the client device 200. Similarly, a client agent application 232 on the reference machine 230 and the server agent application 205 on the server 201 can enable communication between the server 201 and the reference machine 230 such that information such as instructions, requests, and/or data can be communicated between the server 201 and the reference machine 230.

The server 201 further contains a program layer catalog 220 containing program layers, such as program layer 1 through program layer N 250. In various embodiments, the program layers may be application layers or base layers for various applications and/or operating systems. The program layers 250 may be used to perform various IT functions. For example, to install an application or an operating system on a client device (e.g., 200), the corresponding program layer for the application or operating system can be retrieved from the program layers 250 and merged onto the client device (e.g., 200). Similarly, other IT functions, such as updates or bug fixes can be delivered to client devices (e.g., 200) by retrieving corresponding program layer from the program layers 250 on the server and merging the program layer onto the client device (e.g., 200).

As illustrated in the example of FIG. 2, the reference machine 230 contains a program 234. In various embodiments, the reference machine 230 can be a clean virtual machine created by IT for producing an initial program layer for the program 234 and for creating subsequent updated layers for the program 234. For example, IT can create a clean reference machine 230, take a snapshot of the clean virtual machine 230, install the program 234 on the reference machine 230, and take a snapshot after installation. The pre-installation and post-installation snapshots can then be used to create an initial program layer for the program 234. The program layer can be stored on the server 201 in the program layer catalog 220. The program layer can then be merged onto any number of client devices (e.g., 200) to install the program 234 on the client devices (e.g., 200). Further, after the initial program layer is captured, IT can suspend the reference machine 230.

At some time after the program 234 is installed on a client device (e.g., 200), hence becoming one of the programs (e.g., 225) on the client device (e.g., 200), the program 234 may be updated to a newer version. For example, an update may be automatically delivered and installed on the client device (e.g., 200) by the program's 234 automatic update function, via the Internet. Subsequently, the system can detect when such an update to the program 234 has occurred. For example, the system can be configured to periodically (for example, hourly) upload any changes that occur on a client device (e.g., 200), such as for backup purposes. The system can monitor the uploaded changes from the client device (e.g., 200) and detect when a new version of an application or a new version of an operating system has been uploaded. For example, the system can detect new versions by monitoring the Windows MSI database, Windows Update catalog, and Windows event log.

When a new version of a program, for example program 234, is detected on a client device (e.g., 200), the system can check whether an updated program layer for the new version is already present in the program layer catalog 220. If an updated program layer is not present, then the system can initiate the process of capturing an updated program layer. The reference machine 230 can be resumed and the program 234 can be updated. For example, the program 234 can be allowed to update through its automatic update mechanism via the internet. In various embodiments, the system can detect that the update was completed by monitoring the Windows MSI application database or the Windows Update catalog and by monitoring the Windows event log for installation completion events.

Once the update installation is completed, the system can capture an updated layer for the program 234. For example, the updated program layer can be captured based on before- and after-installation snapshots of the reference machine 230. The system can then suspend the reference machine 230 again. The program layer for the updated program 234 can be stored in the program layer catalog 220. The updated program layer can then be used to perform various IT functions requiring the updated program layer. Furthermore, IT can choose to automatically push the updated program layer to any client devices that do not have the update, enhancing compliance and software alignment across the enterprise. Accordingly, the described systems and methods allow for the program layer catalog 220 to be automatically populated in the background, which is triggered by software updates performed on client devices (e.g., 200).

It should be noted that a typical system would include a large number of reference machines in order to provide program layer updates for various applications and operating systems. For example, a different reference machine may exist for each different application and each different operating system that is used by client devices in the system. A single reference machine 230 is illustrated in the example of FIG. 2 for the sake of simplicity.

Hence, a typical system may contain a large number of user computer devices and a large number of reference machines. When the system detected that a program on one of the user client devices has been updated, the system checks whether a program layer is already available in the system's program layer catalog for such updated version of the program. If such an updated program layer is not available, then the system locates a reference machine designated for the program, resumes the reference machine, allows the program to update, captures an updated program layer, resumes the reference machine, and stores the updated program layer in the program layer catalog. In the future, if an IT operation requires the updated program layer, the layer can be retrieved from the program layer catalog and used.

Figure 3:
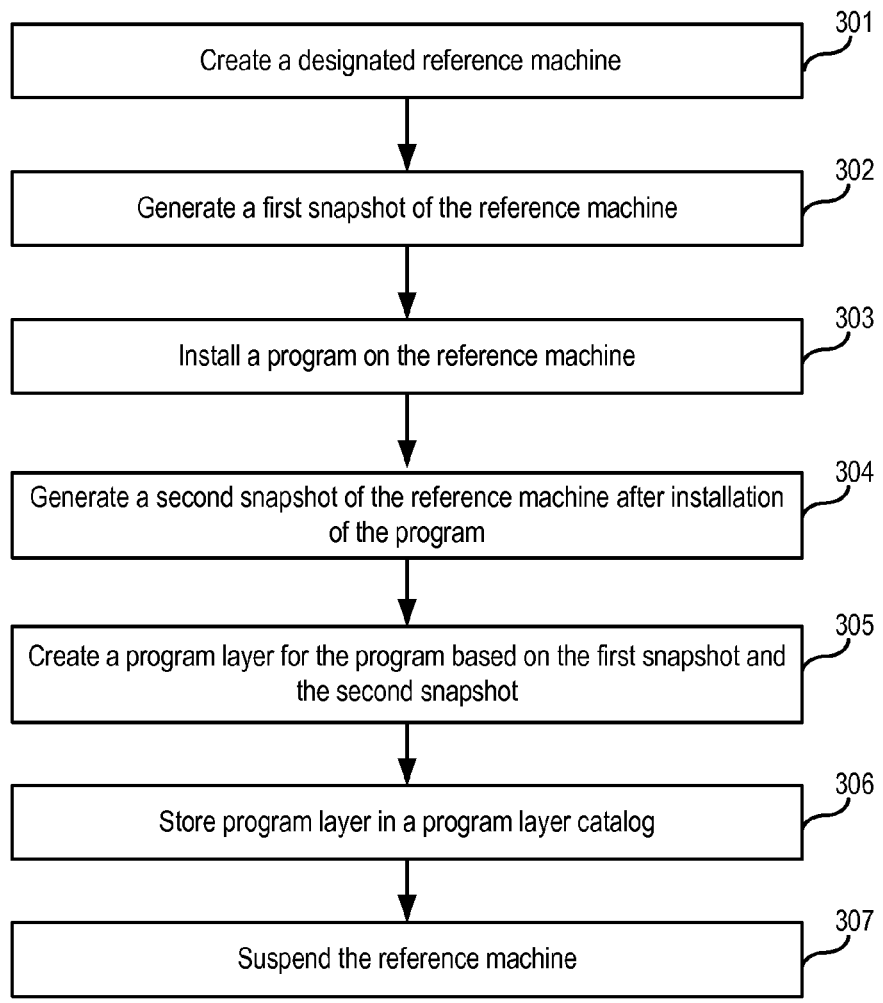
FIG. 3 illustrates an example process flow for producing an initial program layer on a reference machine, in accordance with various embodiments.

FIG. 3 illustrates an example process flow for producing an initial program layer on a reference machine, in accordance with various embodiments. The process starts by IT creating a designated reference machine 301, on which a particular program will be installed to capture an initial program layer for the program. Subsequently, the program can be updated and updated program layers can be automatically captured for the updated program, as described further in FIG. 4. The reference machine can be a clean virtual machine created by IT. A first snapshot can be generated of the reference machine 302 before program installation and the snapshot can be stored. Subsequently, the program for which the reference machine is designated can be installed on the reference machine 303. A second snapshot of the reference machine can be generated after installation of the program 304. A program layer for the program can be created based on the first snapshot and the second snapshot 305. The program layer can be stored in a program layer catalog 306, from where the program layer can be retrieved for performing IT functions, such as merging the program layer onto client devices to install the program. After the program layer is captured, the reference machine can be suspended 307.

Figure 4:
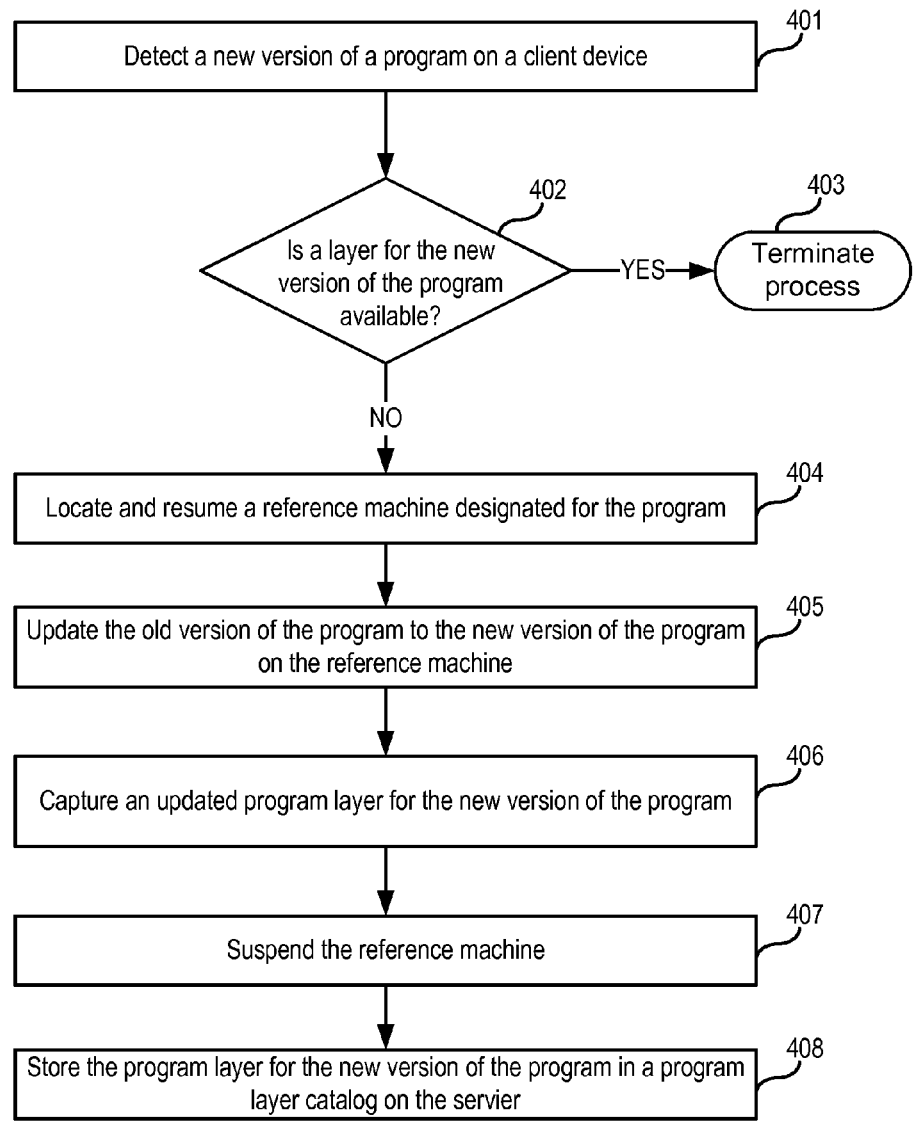
FIG. 4 illustrates an example process flow for automatically generating program layers for program updates, in accordance with various embodiments.

FIG. 4 illustrates an example process flow for automatically generating program layers for program updates, in accordance with various embodiments. The process starts with the system detecting a new version of a program on a client device 401. For example, the system can be configured to periodically (for example, hourly) upload any content or changes that occur on a client device, such as for backup purposes. The system can monitor the uploaded changes from the client device and detect when a new version of an application or a new version of an operating system has been uploaded. For example, the system can detect new versions by monitoring the Windows MSI database, Windows Update catalog, and Windows event log.

Once a new version of a program on a client device is detected, the system checks whether a layer for the new version of the program is available 402. For example, the system can check whether an updated program layer for the new version is already present in a program layer catalog containing available program layers on the server. If an updated program layer is available, then the process can terminate 403 because there is no need to produce a redundant updated program layer. If an updated program layer is not present, then the process for generating an updated program layer can initiate by locating and resuming a reference machine designated for the program 404. For example, as described in this specification, such a designated reference machine could have been created by IT for the purposes of generating an initial program layer and for capturing updated program layers for the program. The reference machine is created to produce an initial program layer and resumed after the initial layer is produced. Subsequently, the reference machine is resumed and subsequently suspended each time it is used to create an updated program layer. Hence, when the reference machine is resumed 404, it contains an older version of the program installed on it, which could be an initial version, or a version that had been updated from the initial version one or more times.

Once the reference machine is resumed, the program can be updated from the old version to the new version 405. For example, the program can be allowed to update through its automatic update mechanism via the internet. In various embodiments, the system can detect that the update was completed by monitoring the Windows MSI application database or the Windows Update catalog and by monitoring the Windows event log for installation completion events.

Once the update is completed, the system can capture an updated program layer for the new version of the program 406. For example, the updated program layer can be captured based on before- and after-installation snapshots of the reference machine. The before-installation snapshot may be stored in the system from previous operations or it may be generated immediately prior to the installation of the new version of the program. The system can then suspend the reference machine again 407. The program layer for the new version of the program can be stored in the program layer catalog on the server 408 so that it can be used to perform various IT functions that require the updated program layer.

Figure 5:
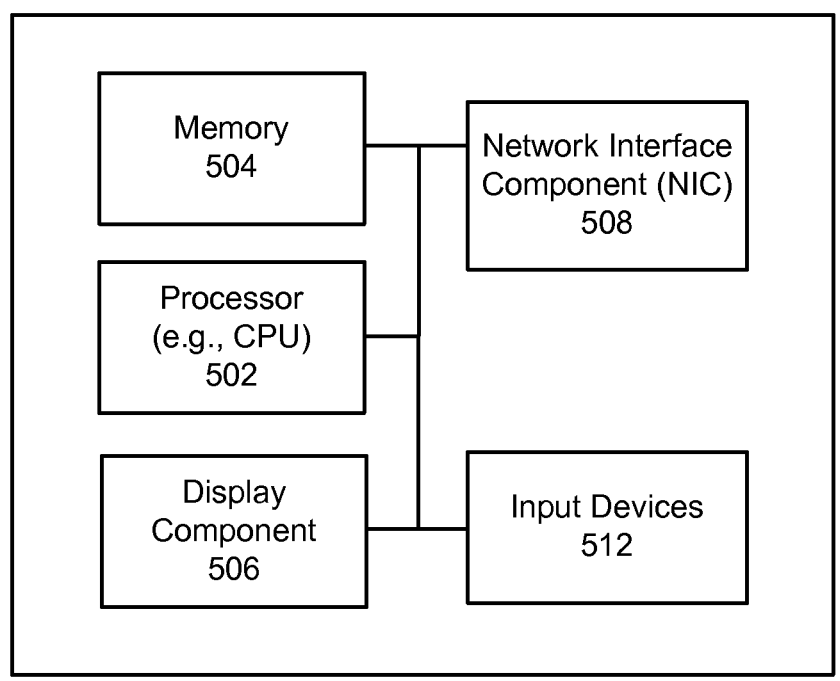
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
installing a first version of a program on a reference machine on a network, the network comprising a plurality of client devices centrally managed by a server;
producing a first program layer for the first version of the program based on the installation of the first version of the program on the reference machine;
uploading information from a client device on the network to the server at a predetermined frequency to back-up the client device;
detecting a second version of the program on the client device based on the uploaded information;
updating the program on the reference machine to the second version of the program; and
producing an updated program layer for the second version of the program based on the updating of the program on the reference machine to the second version of the program.

2. The method of claim 1, wherein:
producing a first program layer for the first version of the program based on the installation of the first version of the program on the reference machine comprises:
capturing a first snapshot of the reference machine prior to installation of the first version of the program;
capturing a second snapshot of the reference machine after installation of the first version of the program; and
wherein the first program layer for the first version of the program is produced based on differences between the first snapshot and the second snapshot.

3. The method of claim 1, wherein:
producing an updated program layer for the second version of the program based on the updating of the program on the reference machine to the second version of the program comprises:
capturing a third snapshot of the reference machine prior to updating of the program on the reference machine to the second version of the program;
capturing a fourth snapshot of the reference machine after updating of the program on the reference machine to the second version of the program; and
wherein the updated program layer for the second version of the program is produced based on differences between the third snapshot and the fourth snapshot.

4. The method of claim 1, further comprising:
suspending the reference machine after producing a first program layer for the first version of the program based on the installation of the first version of the program on the reference machine; and
resuming the reference machine prior to updating the program on the reference machine to the second version of the program.

5. The method of claim 1, further comprising:
after the detecting of the second version of the program on the client device on the network, determining whether a program layer for the second version of the program is available;
wherein, updating the program on the reference machine to the second version of the program and producing the updated program layer for the second version of the program is performed if a program layer for the second version of the program is not available.

6. The method of claim 1, wherein the reference machine is a virtual machine.

7. A computing device, comprising:
at least one hardware processor; and
memory including instructions that, when executed by the at least one processor, cause the computing device to:
install a first version of a program on a reference machine, the network comprising a plurality of client devices centrally managed by a server;
produce a first program layer for the first version of the program based on the installation of the first version of the program on the reference machine;
upload information from the client device to the server at a predetermined frequency to back-up the client device;
detect a second version of the program on the client device based on the uploaded information;
update the program on the reference machine to the second version of the program; and
produce an updated program layer for the second version of the program based on the updating of the program on the reference machine to the second version of the program.

8. The computing device of claim 7, wherein:
producing a first program layer for the first version of the program based on the installation of the first version of the program on the reference machine comprises:
capturing a first snapshot of the reference machine prior to installation of the first version of the program;
capturing a second snapshot of the reference machine after installation of the first version of the program; and
wherein the first program layer for the first version of the program is produced based on differences between the first snapshot and the second snapshot.

9. The computing device of claim 7, wherein:
producing an updated program layer for the second version of the program based on the updating of the program on the reference machine to the second version of the program comprises:
capturing a third snapshot of the reference machine prior to updating of the program on the reference machine to the second version of the program;
capturing a fourth snapshot of the reference machine after updating of the program on the reference machine to the second version of the program; and
wherein the updated program layer for the second version of the program is produced based on differences between the third snapshot and the fourth snapshot.

10. The computing device of claim 7, wherein the memory further includes instructions that when executed by the at least one processor, cause the computing device to:
suspend the reference machine after producing a first program layer for the first version of the program based on the installation of the first version of the program on the reference machine; and
resume the reference machine prior to updating the program on the reference machine to the second version of the program.

11. The computing device of claim 7, wherein the memory further includes instructions that when executed by the at least one processor, cause the computing device to:
after the detecting of the second version of the program on the client device on the network, determine whether a program layer for the second version of the program is available;
wherein, updating the program on the reference machine to the second version of the program and producing the updated program layer for the second version of the program is performed if a program layer for the second version of the program is not available.

12. The computing device of claim 7, wherein the reference machine is a virtual machine.

13. A non-transitory computer readable storage medium comprising one or more sequences of instructions, the instructions when executed by one or more processors causing the one or more processors to execute the operations of:
- installing a first version of a program on a reference machine on a network, the network comprising a plurality of client devices centrally managed by a server;
- producing a first program layer for the first version of the program based on the installation of the first version of the program on the reference machine;
- uploading information from the client device to the server at a predetermined frequency to back-up the client device;
- detecting a second version of the program on the client device based on the uploaded information;
- updating the program on the reference machine to the second version of the program; and
- producing an updated program layer for the second version of the program based on the updating of the program on the reference machine to the second version of the program.

14. The non-transitory computer readable storage medium of claim 13, further comprising instructions that when executed by the one or more processors cause the one or more processors to execute the operations of:
- producing a first program layer for the first version of the program based on the installation of the first version of the program on the reference machine comprises:
- capturing a first snapshot of the reference machine prior to installation of the first version of the program;
- capturing a second snapshot of the reference machine after installation of the first version of the program;
- wherein the first program layer for the first version of the program is produced based on differences between the first snapshot and the second snapshot.

15. The non-transitory computer readable storage medium of claim 13, further comprising instructions that when executed by the one or more processors cause the one or more processors to execute the operations of:
- producing an updated program layer for the second version of the program based on the updating of the program on the reference machine to the second version of the program comprises:
- capturing a third snapshot of the reference machine prior to updating of the program on the reference machine to the second version of the program;
- capturing a fourth snapshot of the reference machine after updating of the program on the reference machine to the second version of the program; and
- wherein the updated program layer for the second version of the program is produced based on differences between the third snapshot and the fourth snapshot.

16. The non-transitory computer readable storage medium of claim 13, further comprising instructions that when executed by the one or more processors cause the one or more processors to execute the operations of:
- suspending the reference machine after producing a first program layer for the first version of the program based on the installation of the first version of the program on the reference machine; and
- resuming the reference machine prior to updating the program on the reference machine to the second version of the program.

17. The non-transitory computer readable storage medium of claim 13, further comprising instructions that when executed by the one or more processors cause the one or more processors to execute the operations of:
- after the detecting of the second version of the program on the client device on the network, determining whether a program layer for the second version of the program is available;
- wherein, updating the program on the reference machine to the second version of the program and producing the updated program layer for the second version of the program is performed if a program layer for the second version of the program is not available.

* * * * *